July 28, 1959 D. V. GEPPERT 2,897,456

DISSIPATIONLESS DIFFERENTIAL PHASE SHIFTERS

Filed Feb. 28, 1956 2 Sheets-Sheet 1

INVENTOR.

DONOVAN V. GEPPERT

BY

ATTORNEY

July 28, 1959 D. V. GEPPERT 2,897,456
DISSIPATIONLESS DIFFERENTIAL PHASE SHIFTERS
Filed Feb. 28, 1956 2 Sheets-Sheet 2

INVENTOR.
DONOVAN V. GEPPERT
BY
[signature]
ATTORNEY 2,897,456

DISSIPATIONLESS DIFFERENTIAL PHASE SHIFTERS

Donovan V. Geppert, Mountain View, Calif., assignor, by mesne assignments, to Sylvania Electric Products Inc., Wilmington, Del., a corporation of Delaware Application February 28, 1956, Serial No. 568,310

10 Claims. (Cl. 333—9)

My invention is directed toward electrically passive differential phase shifting devices adapted for use at microwave frequencies.

Recent advances in the microwave art have developed a need for an electrical passive phase shifting device which, over a broad frequency, will derive two output signals from an incoming signal having a frequency falling within the band in such manner that a predetermined differential phase shift is established between the two output signals. Such a device can find extensive use in various types of broad band microwave equipment, such as mixers, modulators, harmonic generators and antenna phasing networks.

I have invented a device of this kind which is not only electrically passive but is essentially lossless (i.e. does not dissipate appreciable power) and further which provides a substantially constant differential phase shift over a broad frequency band.

Accordingly, it is an object of the present invention to provide a new and improved differential phase shifting device of the character indicated.

Another object is to improve differential phase shifting devices by reducing the power dissipation to a substantially negligible amount and at the same time by permitting the differential phase shift to be held substantially constant over a broad frequency band.

Still another object is to provide an electrically passive, substantially dissipationless, differential phase shifter device which incorporates first and second linear, passive, symmetrical two terminal pair networks.

Yet another object is to provide a differential phase shifter device which includes first and second passive symmetrical two terminal pair networks having their input terminals connected in parallel, each of the two output signals being developed across the output terminals of a corresponding one of said networks.

These and other objects of my invention will either be explained or will become apparent hereinafter.

It is known to the art that a linear passive two terminal pair network is defined by the second order square matrix $$\begin{vmatrix} E_1 \\ I_1 \end{vmatrix} = \begin{vmatrix} A & B \\ C & D \end{vmatrix} \times \begin{vmatrix} E_2 \\ I_2 \end{vmatrix}$$

where $E_1$ and $E_2$ respectively represent the input and output voltages. $I_1$ and $I_2$ respectively represent the input and output currents.

When this matrix is solved, it will be found that $$E_1 = AE_2 + BI_2$$

and $$I_1 = CE_2 + DI_2$$

When the output terminals of this network are open circuited, there is no output current, and A will be found to define the ratio of input voltage to output voltage $$\left(\frac{E_1}{E_2}\right) I_2 = 0$$

Further, C will be found to define the ratio of input current to output voltage $$\left(\frac{I_1}{E_2}\right) I_2 = 0$$

When the output terminals of the network are short circuited, there is no output voltage, and B will be found to define the ratio of input voltage to output current $$\left(\frac{E_1}{I_2}\right) E_2 = 0$$

Similarly, D will be found to define the ratio of input current to output current $$\left(\frac{I_1}{I_2}\right) E_2 = 0$$

When the ratio of input to open circuit output voltage is equal to the ratio of input to short circuit output current, that is, when A is equal to D, the network is defined as a symmetrical network.

If the output circuit of a symmetrical network is terminated in its image impedance, and an incoming signal whose frequency falls within the bandpass range of the network is supplied to the input circuit of the network, the output signal yielded by the network will be shifted by an angle $\phi$ with respect to the input signal where $$\phi = \cos^{-1} A$$

In most cases it is not possible to terminate such a network in its image impedance, and normally, the termination impedance is a pure resistance. Under these conditions, the phase shift angle $\phi$ is defined by the relation $$\phi = \tan^{-1}\left(\frac{B}{jAR}\right)$$

where R represents the termination impedance, and B A are defined as previously indicated.

Then, if two such networks are supplied with the same input signal, the phase shift angle between the input signal and the output signal of one network being $\phi_1$ and the phase shift angle between the same input signal and the output signal of the other network being $\phi_2$, a differential phase shift $\Delta\phi$ between the two output signals will be produced, where $$\Delta\phi = (\phi_1 - \phi_2)$$

Accordingly, in my invention there is provided first and second electrically passive and symmetrical two terminal pair networks, the output terminals being terminated in corresponding first and second impedances. (These termination impedances can be either image impedances or constant resistances.) The input terminals of both networks are connected in parallel.

When an incoming signal having a frequency falling within a predetermined frequency range (i.e. the range defined by the bandpass characteristics of the interconnected networks) is supplied to these paralleled terminals, individual output voltages are produced across each of the termination impedances. These output voltages exhibit a differential phase shift with respect to each other which is substantially constant over the said range.

The ratios of input voltage to output voltage for the first and second networks, when their corresponding output terminals are open circuited, are $A_1$ and $A_2$ respectively. The ratios of input voltage to output current for the first and second networks, when their corresponding output terminals are short circuited, are $B_1$ and $B_2$ respectively.

When the networks are terminated in their image impedances, the differential phase shift depends only upon the values of $A_1$ and $A_2$. More specifically $$\Delta\phi=(\phi_1-\phi_2)=(\cos^{-1}A_1-\cos^{-1}A_2)$$

In this situation, when a differential phase shift of 180° is required, it will be found by the use of well known computation techniques that $$A_2=-A_1$$

Further, when a differential phase shift of 90° is required, it will be found that $$A_2=\frac{dA_1}{d\phi_1}$$

where $$\frac{dA_1}{d\phi}$$

is the derivative of $A_1$ with respect to $\phi_1$.

When the first and second networks are terminated in resistances $R_1$ and $R_2$ respectively, the differential phase shift depends not only upon the values of $A_1$ and $A_2$, but also upon the values of $B_1$, $B_2$, $R_1$ and $R_2$. More specifically, $$\Delta\phi=\phi_1-\phi_2=\tan^{-1}\left(\frac{B_1}{jA_1R_1}\right)-\tan^{-1}\left(\frac{B_2}{jA_2R_2}\right)$$

$$=\tan^{-1}--j\left(\frac{A_2R_2B_1-A_1R_1B_2}{A_1A_2R_1R_2-B_1B_2}\right)$$

In this situation when a differential phase shift of 180° is desired, it will be found that $$A_2R_2B_1=A_1R_1B_2$$

Further, when a differential phase shift of 90° is required, it will be found that $$A_1A_2R_1R_2=B_1B_2$$

Illustrative embodiments of my invention will now be described with reference to the accompanying drawings wherein Fig. 1 shows my invention in block form;

Figure 1:
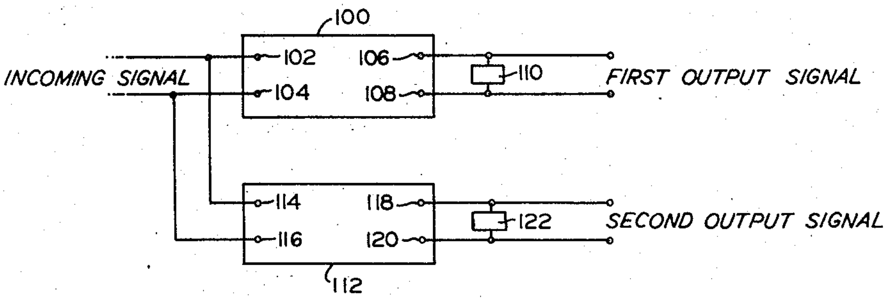

Referring now to Fig. 1, there is provided a first passive linear two terminal pair network 100 provided with a pair of input terminals 102 and 104 and a pair of output terminals 106 and 108. A termination impedance 110 (which for example can be an image impedance or a pure resistance) is coupled between the output terminals 106 and 108.

There is also provided a second such network 112 provided with input terminals 114, 116 and output terminals 118, 120. A second termination impedance 122 is coupled between output terminals 118 and 120. Terminal 114 is connected to terminal 102 and terminal 116 is connected to terminal 104.

When an incoming signal is applied between terminals 102 and 104, a first output signal shifted in phase by an angle $\phi_1$ with respect to the incoming signal appears across terminals 106, 108 and a second output signal shifted in phase by an angle $\phi_2$ with respect to the incoming signal appears across terminals 118, 120.

Figure 2:
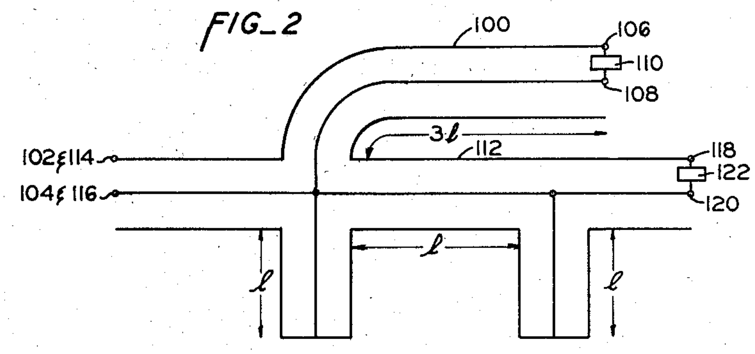
Fig. 2 shows one particular circuit in accordance with my invention.

Fig. 2 shows one detailed embodiment of the arrangement shown in Fig. 1. Network 100 in this case is a transmission line having a characteristic impedance Z and a length 3l and network 112 is a $\pi$ section having two shorted stubs of characteristic impedance Z and length $l$ shunted across a transmission line having a characteristic impedance Z, the two shorted stubs being spaced apart by a distance equal to the stub length. The ratios A and B of these networks satisfy the relationships $$A_1=\cos\theta_1$$

$$A_2=2\cos\theta_2$$

$$B_1=jZ\sin\theta_1$$

$$B_2=jZ\sin\theta_2$$

$$\theta_1=3\theta_2=\frac{3\omega l}{v}$$

where $\omega=2\pi f$ ($f$ being the frequency of the incoming signal) ($v$ equals velocity of wave travel in each line).

For a 180° differential phase shift, when as in this example, each network is terminated in its image impedance, it has been shown that the relation $A_2=-A_1$ should hold.

Figure 3:
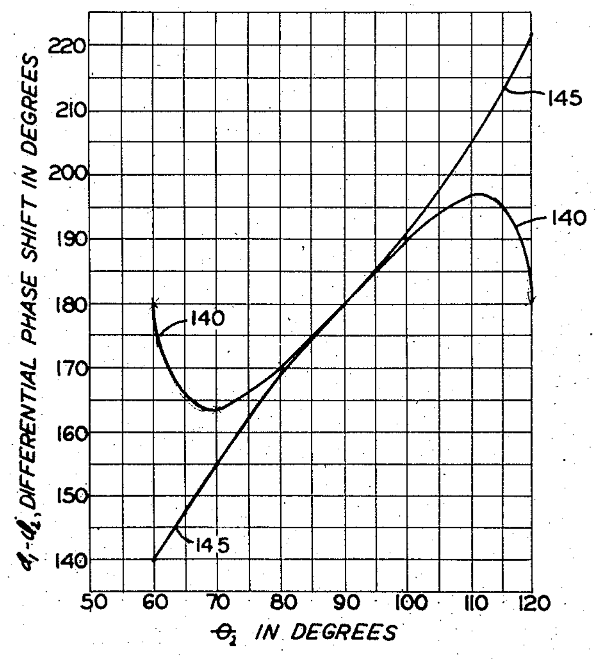
Figs. 3 and 4 are graphs which assist is describing the operation of the circuit of Fig. 2.

In the interval $$\frac{\pi}{3}<\theta_2<\frac{2\pi}{3}$$

it can be shown that $\cos\theta_1\simeq-2\cos\theta_2$ or $A_1\simeq-A_2$. A graph 140 of the differential phase shift angle $\theta_2$ is shown in Fig. 3. It will be seen that a 180° differential phase shift is obtained when $\phi_2$ is equal to 60°, 90° or 120°.

When the above networks are modified by using termination resistors $R_1$ and $R_2$ having values equal to the characteristic impedance of each network, so that, as has been shown previously, for a 180° differential phase shift, the relation $A_2R_2B_1=A_1R_1B_2$ is satisfied, the resulting plot 145 of differential phase shift against angle $\phi_2$ is also shown in Fig. 3. It will be seen that this plot shows an approximately linear relationship between $\Delta\phi$ and $\phi_2$. The 180° differential shift is obtained when $\phi_2=90°$.

In any network of the type discussed herein, the ratios A and B are not constant but vary with frequency. The permissible variation in these ratios is defined by the permissible differential phase error in degrees as compared to the theoretical differential shift desired.

For example, for the case of a desired 90° phase shift, if a 10° error in differential shift is permitted, then $\theta_2$ can vary between 80° and 100°. The signal frequencies which maintain the ratios A and B at such values that $\phi_1-\phi_2$ is held within the values indicated then define the frequency band over which the phase shifter will operate in the manner indicated. (It will be noted that the allowable variation in $\theta_2$ for 10° error in differential shift is approximately the same for both characteristic resistance and image impedance termination as shown in Fig. 3.)

The width of this frequency band for a specified differential shift error can be increased if the electrical characteristics of the shifter device can be adjusted to permit a larger variation in $\theta_2$ for the error indicated. One method of accomplishing this is to vary the ratio of series line to shunt line impedance in the $\pi$ section of Fig. 2. (The section previously discussed used equal series line and shunt line impedances.) In this case, if $Z_1$ is the series line impedance and $Z_2$ is the impedance of the shorted stubs, it will be found that $$A_2=\left(1+\frac{Z_1}{Z_2}\right)\cos\theta_2$$

$$B_2=jZ_1\sin\theta_2$$

Figure 4:
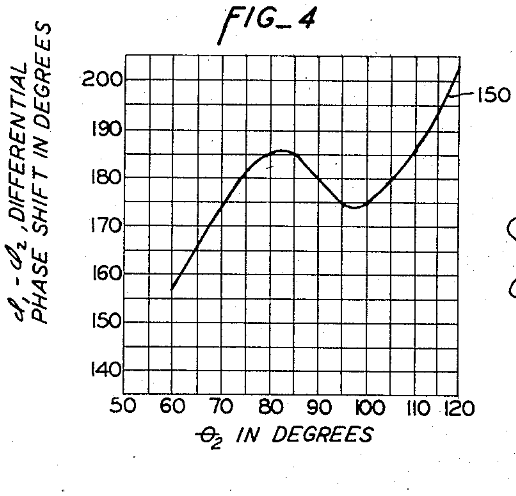

For an impedance ratio $$\frac{Z_1}{Z_2}$$

of 3, it will be seen that, as shown in the graph 150 of Fig. 4 for a 10° shift error, $\theta_2$ can vary from 67° to 113°, permitting a wider frequency band.

Figure 5:
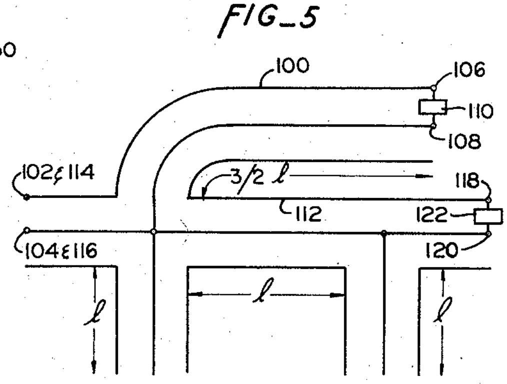
Fig. 5 shows a second particular circuit in accordance with my invention.

Fig. 5 shows a second embodiment of the arrangement shown in Fig. 2. The first network is again a transmission line having an impedance Z and terminated in a resistance $R_1$ equal to the characteristic impedance of the line. If the length of this line is $$\frac{3l}{2}$$

then the second network is an open $\pi$ network consisting of two open circuited stubs of impedance $Z_2$ and length $l$ connected by a series line of impedance $Z_1$ and length $l$ and terminated in a resistance $R_2$. The ratios of these networks satisfy the relations $$A_1=\cos\theta_1$$

$$A_2=\left[\left(1+\frac{Z_1}{Z_2}\right)\cos\theta_2-\frac{Z_1}{Z_2}\frac{1}{\cos\theta_2}\right]$$

$$B_1=jZ\sin\theta_1$$

$$B_2=jZ_1\sin\theta_2$$

Figure 6:
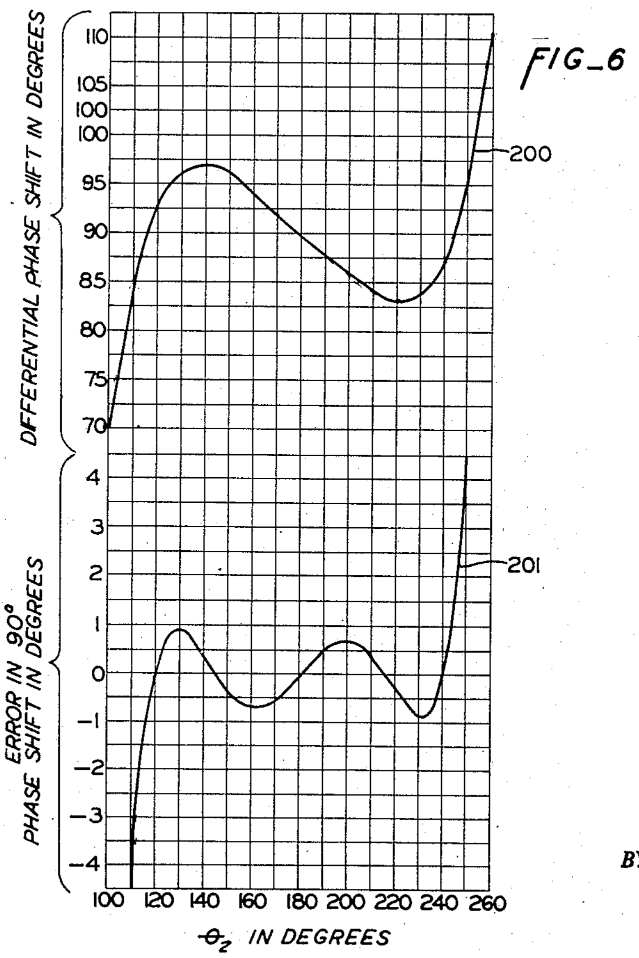
Fig. 6 is a graph which assists in describing the operation of the circuit of Fig. 5.

Fig. 6 shows a graph 200 of differential phase shift angle vs. $\theta_2$ for the circuit of Fig. 5. An impedance ratio $$\frac{Z_1}{Z_2}$$

of .3 was used, and the resistors $R_1$ and $R_2$ were selected to perfectly match the network impedances when $\theta_2$ is 180°.

By mismatching the resistor $R_2$ slightly when $\theta_2$ is 180° (for this example $$R_2=\frac{Z_1}{1.56})$$

a large variation in $\theta_2$ for a given phase shift error can be obtained as shown in the graph 201 of Fig. 6. In this example $$\frac{Z_1}{Z_2}=0.333$$

While I have shown and pointed out my invention as applied above, it will be apparent to those skilled in the art that many modifications can be made within the scope and sphere of my invention as defined in the claims which follow.

What is claimed is:

1. A differential phase shifter for producing two outputs having an approximately constant phase difference over a wide frequency range comprising a transmission line section having a pair of input terminals and a pair of output terminals, a $\pi$-network having a pair of input terminals connected in parallel with the input terminals of said transmission line section and a pair of output terminals, said $\pi$-network consisting of two transmission line stubs of equal length shunted across a series transmission line and spaced apart a distance equal to the stub length, and first and second terminating impedances respectively connected across the output terminals of said transmission line section and across the output terminals of said $\pi$-network.

2. A differential phase shifter for producing two outputs having an approximately constant 180° phase difference over a wide frequency range comprising a transmission line section having a pair of input terminals and a pair of output terminals, a $\pi$-network having a pair of input terminals connected in parallel with the input terminals of said transmission line section and a pair of output terminals, said $\pi$-network consisting of two shorted transmission line stubs of equal length shunted across a series transmission line and spaced apart a distance equal to the stub length, the length of said transmission line section being approximately three times the length of said stubs, and first and second terminating impedances respectively connected across the output terminals of said transmission line section and across the output terminals of said $\pi$-network.

3. Apparatus in accordance with claim 2 wherein said transmission line section, said series transmission line and each of the stubs of said $\pi$-network have the same characteristic impedance, and said terminating impedances comprise first and second resistors each having a resistance approximately equal to said characteristic impedance.

4. Apparatus in accordance with claim 2 wherein said transmission line section and the series transmission line of said $\pi$-network have the same characteristic impedance and said stubs have a characteristic impedance approximately ⅓ the characteristic impedance of said transmission line section, and said terminating impedances comprise first and second resistors each having a resistance approximately equal to the characteristic impedance of said transmission line section.

5. A differential phase-shifter for producing two outputs having an approximately constant 90° phase difference over a wide frequency range comprising a transmission line section having a pair of input terminals and a pair of output terrminals, a $\pi$-network having a pair of input terminals connected in parallel with the input terminals of said transmission line section and a pair of output terminals, said $\pi$-network consisting of two open-circuited transmission line stubs of equal length shunted across a series transmission line and spaced apart a distance equal to the stub length, the length of said transmission line section being approximately 1½ times the length of said stubs, and first and second terminating impedances respectively connected across the output terminals of said transmission line section and across the output terminals of said $\pi$-network.

6. Apparatus in accordance with claim 5 wherein said transmission line section, said series transmission line and each of said stubs have the same characteristic impedance and said terminating impedances comprise first and second resistors each having a resistance approximately equal to said characteristic impedance.

7. Apparatus in accordance with claim 5 wherein said transmission line section and the series transmission line of said $\pi$-network have the same characteristic impedance and said stubs have a characteristic impedance approximately 3⅓ times the characteristic impedance of said transmission line section, and said terminating impedances comprise first and second resistors each having a resistance approximately equal to the characteristic impedance of said transmission line section.

8. A differential phase shifter for producing two outputs having an approximately constant phase difference over a wide frequency range comprising, a section of coaxial transmission line having inner and outer conductors, a $\pi$-network consisting of a series coaxial transmission line and two coaxial transmission line stubs of equal length connected in shunt with said series coaxial transmission line and spaced apart a distance equal to the length of said stubs, one end of said series coaxial line being joined to one end of said section of coaxial transmission line with corresponding conductors connected together, and first and second terminating impedances connected to the other end of said section of coaxial transmission line and to the other end of said series coaxial transmission line, respectively.

9. Apparatus in accordance with claim 8 wherein said stubs are short-circuited, said coaxial transmission line section, said series coaxial transmission line and the stub transmission lines of said $\pi$-network have the same characteristic impedance, and said terminating impedances comprise first and second resistors each having a resistance approximately equal to said characteristic impedance.

10. Apparatus in accordance with claim 8 wherein said stubs are open-circuited, said coaxial transmission line, said series coaxial transmission line and the transmission line of each of said stubs have the same characteristic impedance, and said terminating impedances comprise first and second resistors each having a resistance approximately equal to said characteristic impedance.

References Cited in the file of this patent

UNITED STATES PATENTS 2,231,839 Lindenblad ............. Feb. 11, 1941
2,421,033 Mason ................. May 27, 1947
2,661,458 Saraga ................. Dec. 1, 1953